United States Patent Office 3,021,339
Patented Feb. 13, 1962

3,021,339
2-SUBSTITUTED-2,3-DIHYDRO-5,6-DICYANO-1,4-DITHIINS
Dale C. Blomstrom and Blaine C. McKusick, Wilmington, Del., assignors to E. I. du Pont de Nemours and Company, Wilmington, Del., a corporation of Delaware
No Drawing. Filed Oct. 5, 1959, Ser. No. 844,181
14 Claims. (Cl. 260—326.5)

This invention relates to a new class of organic heterocyclic compounds. More particularly, it relates to new cyclic sulfides having cyano substituents and to the preparation of these compounds.

Very few cyclic sulfides having cyano substituents on the nuclear carbon atoms have been reported in the chemical literature. In view of the continuously increasing scientific and technical interest in the chemistry of cyanocarbons and their derivatives, there is a need for extending the present meager knowledge of cyano-substituted for heterocyclic compounds.

This invention provides a new class of products, the 2-substituted-2,3-dihydro-5,6-dicyano-1,4-dithiins of the formula

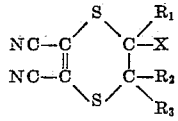

wherein $R_1$, $R_2$ and $R_3$ are hydrogen or hydrocarbon groups and X is a radical of the class of hydrocarbbyloxy, —OR; alkoxyhydrocarbyloxy, —OROR'; hydrocarbylthio, —SR; hydrocarbyloxyaryl, —ArOR; N,N-(dialkylamino)-aryl,

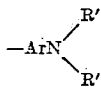

N-(hydrocarbyl)sulfonamido,

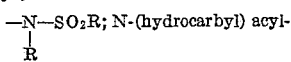

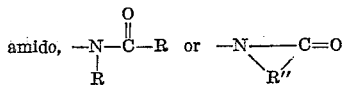

and oxygen joined to $R_2$ to form an oxyalkylene radical. In the formulas representing the various radicals, Ar stands for an aromatic hydrocarbon group, R' for an alkyl group and R for an hydrocarbon group free from non-aromatic unsaturation, and R" is an alkylene radical. It will be understood that, in a given compound, the various hydrocarbon groups can be alike or different.

The specific radicals defined above under the symbol X have, as a common characteristic, that of being electron-releasing radicals which, when attached to a carbon atom doubly bonded to another carbon atom, donate electrons to the unsaturation center. They comprise some of the principal ortho, para-directing groups in aromatic substitution reactions.

The products of this invention are prepared by a process which comprises bringing in contact a mixture of disodium dimercaptomaleonitrile, $$NaS—C(CN)=C(CN)—SNa$$

and an unsaturate of the formula

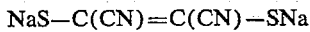

wherein $R_1$, $R_2$, $R_3$ and X have the above-stated significance, with an oxidizing agent capable of oxidizing the sulfhydryl group to the disulfide group, this oxidizing agent being one of the class including the alkali metal ferricyanides, the halogens, the sulfur chlorides and oxychlorides, perchloryl fluoride and the ammonium and alkali metal persulfates.

The mechanism of the reaction is not definitely known. Whatever the intermediates involved may be, however, it is known that a mild oxidizing agent capable of effecting the above-mentioned type of oxidation is necessary.

The process can be represented by the following illustrative equations, where the oxidizing agents chosen as representative examples are potassium ferricyanide and thionyl chloride, respectively:

A.
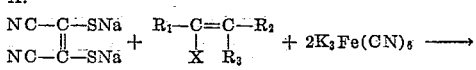

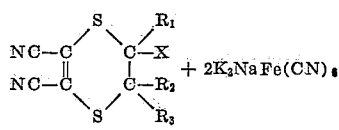

B.
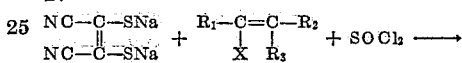

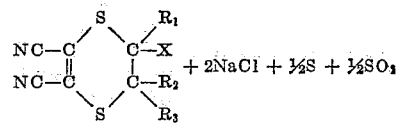

A competing reaction in this process generally forms, as a by-product, variable amounts of tetracyano-1,4-dithiin,

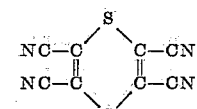

a solid decomposing above 200° C.

One of the reactants in this process, disodium dimercaptomaleonitrile, also called 1,2-dicyano-1,2-disodiothioethylene, was first reported by Bähr and Schleitzer in Ber. 90, 438 (1957). It is a yellow crystalline solid, readily prepared by spontaneous coupling, with loss of sulfur, of sodium cyanodithioformate in water or chloroform solution. Sodium cyanodithioformate is itself prepared by reaction of sodium cyanide with carbon disulfide.

The other reactant participating in the formation of the final product is an unsaturate as defined above. Such materials are available commercially or can be prepared by known methods. Examples of suitable unsaturates include methyl vinyl ether, ethyl vinyl ether, 1-methoxy-propene, 2-ethoxy-2-butene, dodecyl vinyl ether, octadecyl vinyl ether, α- or β-naphthyl vinyl ether, benzyl vinyl ether, cyclohexyl vinyl ether, β-methoxyethyl vinyl ether, p-ethoxyphenyl vinyl ether, ethyl vinyl sulfide, octadecyl vinyl sulfide, phenyl vinyl sulfide, p-methoxystyrene, o-butoxystyrene, p-phenoxystyrene, 1-(p-methoxyphenyl)-propene, 1-ethoxy-2-vinyl naphthalene, p-dimethylamino) - styrene, o - (diethylamino) styrene, N-methyl-N-vinylethane-sulfonamide, N-ethyl-N - vinylcyclohexanesulfonamide, N - propyl-N-vinyl-p-toluenesulfonamide, N-methyl-N-vinyl-propionamide, N-methyl-N-vinylpalmitamide, N-butyl-N-vinyl-benzamine, N-vinyl-2-pyrrolidone, N-vinyl-2-piperidone, N-vinyl-caprolactam, dihydropyran, 2-methyl-5,6-dihydropyran, 2-ethyl-4,5-dihydrofuran, etc. The most accessible, and therefore preferred, unsaturates for use in this process are those having from 3 to 20 carbon atoms, i.e., in which the substituents attached to the doubly bonded carbons have together a total of 1 to 18 carbon atoms. Especially preferred, because of their generally higher reactivity, are the unsaturates in which the unsaturation is present as a terminal methylene group or as an intracyclic vinylene, —CH=CH— group.

The third reactant in the process is an oxidizing agent capable of oxidizing the sulfhydryl group to the disulfide group and having but little tendency to carry the oxidation further. Suitable agents include sodium and potassium ferricyanide, the halogens (chlorine, bromine and iodine), the sulfur chlorides ($SCl_2$ and $S_2Cl_2$, or the equivalent system of elemental sulfur and chlorine used simultaneously), the sulfur oxychlorides ($SOCl_2$ and $SO_2Cl_2$), perchloryl fluoride, ammonium persulfate and the alkali metal, e.g., sodium and potassium, persulfates. Some of these, for example chlorine or the sulfur chlorides, are capable of reacting with the more reactive unsaturates, but they are nevertheless useable provided their rate of reaction with disodium dimercaptomaleonitrile is appreciably greater than with the unsaturate being used. The preferred agents for general use are potassium ferricyanide and thionyl chloride.

The relative proportions of the reactants are not critical. They are of importance only to the extent that it is desired to obtain the maximum amount of 2-substituted-2,3-dihydro-5,6-dicyano-1,4-dithiin with the minimum of by-product such as tetracyano-1,4-dithiin. For this reason, it is preferred to use at least one mole of the unsaturate per mole of disodium dimercaptomaleonitrile, and desirably the former is used in slight to moderate excess, e.g., between 1 and 3.5 moles per mole of disodium dimercaptomaleonitrile. The oxidizing agent is preferably used in approximately the amount required by the stoichiometry of the reaction or in slight excess thereover, for example, one mole or slightly more of thionyl chloride or two moles or slightly more of potassium ferricyanide per mole of disodium dimercaptomaleonitrile.

The reaction is conveniently carried out in a medium, liquid at the operating temperature, which dissolves the reactants to at least some extent. When the oxidizing agent is soluble in and substantially unaffected by water (e.g., potassium ferricyanide, the persulfates), the reaction medium can be water, or mixtures of water with a water-miscible solvent which increases the solubility of the organic reactants. When the oxidizing agent is reactive with water, use is made of a substantially anhydrous organic liquid which dissolves the reactants to at least some extent and is essentially unreactive towards them under the reaction conditions. For this purpose, there can be used a liquid organic compound consisting of carbon and hydrogen and at least one additional element, the latter being one or more of the elements oxygen, sulfur and nitrogen, no other elements being present, and the organic compound being moreover free of non-aromatic carbon-to-carbon unsaturation and free of active hydrogen. Active hydrogen is defined here, as usual, as hydrogen detectable by the well known Zerewitinoff test. It can also be defined alternatively as hydrogen directly attached to an element other than carbon. Suitable organic reaction media include acyclic or cyclic ethers such as di-n-butyl ether, 1,2-dimethoxyethane, 1,2-diethoxyethane, tetrahydrofuran, dioxane, anisole, etc.; carboxylic acid esters such as methyl acetate, ethyl acetate, n-octyl acetate, methyl butyrate, ethyl benzoate, etc.; nitriles such as acetonitrile, propionitrile, butyronitrile, adiponitrile, benzonitrile, etc.; tertiary amines such as triethylamine, pyridine, N,N-diethylaniline, etc.; nitro and nitroso compounds such as nitromethane, nitroethane, nitrobenzene, p - nitrotoluene, methyl-p-nitrobenzoate, N-nitrosodimethylamine, etc.; substituted amides such as N,N-dimethylformamide, N,N'-dimethylacetamide, tetramethylurea, etc.; sulfides, sulfoxides, and sulfones such as diethyl sulfide, di-n-butyl sulfide, dimethyl sulfoxide, diethyl sulfoxide, tetramethylene cyclic sulfone, etc.; and the like. For reasons of economy and ease of handling, the preferred reaction media are those, defined as above, which contain from one to ten carbon atoms. The aliphatic diethers and the cyclic ethers are especially preferred.

The reaction medium need only be able to dissolve the reactants to a very limited extent, which can be as low as 0.1% by weight at the operating temperature. For example, the reaction proceeds rapidly in diluents such as 1,2-dimethoxyethane or tetrahydrofuran whose solvent power for disodium dimercaptonitrile is of this low order. The amount of liquid diluent is immaterial provided it is sufficient to form a liquid phase, i.e., to maintain the disodium dimercaptonitrile and the inorganic products which form during the reaction in partial solution or suspension. In practice, there is desirably used a weight of diluent equal to 2–20 times the weight of disodium dimercaptomaleonitrile.

The reaction is exothermic and does not require the application of external heat. It can take place at temperatures as low as —50° C. with a reaction medium which is liquid at such temperatures. For convenience, the reaction is generally conducted so that the internal temperature is in the neighborhood of the ambient temperature, e.g., between 0 and 50° C. However, moderate heating, e.g., up to 150° C., can be used if desired, especially near the end of the reaction, to promote complete utilization of the disodium dimercaptomaleonitrile.

The reaction is conveniently carried out at atmospheric pressure by adding the oxidizing agent, if desired as a solution in the reaction medium used, gradually or all at once to the liquid reaction medium containing the disodium dimercaptonitrile and the unsaturate in suspension or partial solution, or by adding the disodium dimercaptomaleonitrile to a mixture of the unsaturate and oxidizing agent. Alternatively, the reactants can be placed in a cold pressure vessel which is then sealed, and the reaction is allowed to proceed at ambient or higher temperature under the autogenous pressure developed by the reactants and reaction medium. In either case, stirring is beneficial, though not essential.

The reaction is rapid and does not require a prolonged period of contacts between the reactants. Its completion can be readily ascertained in several ways, such as cessation of heat evolution, disappearance of the deep red color which develops initially when the reactants are brought in contact, and lack of further formation of inorganic products such as sodium chloride. Generally speaking, the reaction is essentially completed within a period of time ranging from a few minutes to two hours.

The 2-substituted-2,3-dihydro-5,6-dicyano-1,4-dithiins are generally solids which can be separated from the reaction mixture in various ways. When the reaction is carried out in an aqueous medium, the reaction product, if it is insoluble, can be separated by filtration and recrystallized from a suitable organic solvent. If it is partly or wholly dissolved in the aqueous medium, it can be removed from it by extraction with a water-immiscible organic solvent. When the reaction is carried out in an organic medium, the inorganic salts can be separated by filtration, after which the filtrate is evaporated and the residue taken up in an appropriate solvent. If tetracyano-1,4-dithiin is present as a by-product, it can be separated from the dicyano compound without difficulty, owing to its generally lesser solubility in certain solvents such as diethyl ether or methylene chloride. Another method of separating the two compounds consists in subjecting to liquid phase chromatography an organic solvent solution of their mixture.

The invention is illustrated in greater detail in the following examples.

*Example I*

A mixture of 10 g. (0.054 mole) of disodium dimercaptomaleonitrile, 11.6 g. (0.161 mole) of ethyl vinyl ether and 90 ml. of 1,2-dimethoxyethane was cooled in an ice bath and stirred while a solution of 6.4 g. (0.054 mole) of thionyl chloride in 15 ml. of 1,2-dimethoxyethane was added over a 30-minute period. A deep red color formed at first which faded to a pale yellow part way through the addition. When the addition was completed, the reaction mixture was filtered and the filtrate was evaporated to dryness under reduced pressure. By repeated extraction of the solid residue with boiling diethyl ether there was obtained 1.55 g. of a white crystalline solid which, after another recrystallization from diethyl ether, melted at 105.5–106° C. This product was 5,6-dicyano-2-ethoxy-2,3-dihydro-1,4-dithiin,

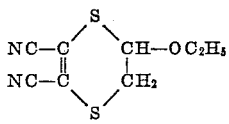

*Analysis.*—Calc'd for $C_8H_8N_2OS_2$: C, 45.25; H, 3.77; N, 13.20; S, 30.20. Found: C, 45.41; H, 4.02; N, 13.30; S, 30.30.

The infrared, ultraviolet and nuclear magnetic resonance spectra confirmed the assigned structure.

A better yield of this compound was obtained when, after carrying out the reaction as described above, filtering off the inorganic products and evaporating the filtrate to dryness, the solid residue was extracted with hot methylene chloride. This left an undissolved residue (16% yield) of crude tetracyano-1,4-dithiin, formed as a by-product during the reaction. Methylcyclohexane was added to the hot methylene chloride solution until crystallization began. On cooling the solution, there was obtained a 63% yield of pure 5,6-dicyano-2-ethoxy-2,3-dihydro-1,4-dithiin, M.P. 107.5–109° C.

*Example II*

The product of Example I was obtained with the use of potassium ferricyanide as the oxidizing agent as follows: A solution of 5.0 g. (0.027 mole) of disodium dimercaptomaleonitrile and 6.0 g. (0.083 mole) of ethyl vinyl ether in a mixture of 50 ml. of water and 20 ml. of methanol was stirred in an ice bath while a solution of 17.7 g. (0.054 mole) of potassium ferricyanide in 125 ml. of water was added over a 15-minute period. The brown, tarry solid reaction product was separated by filtration and washed with water. It was then washed with cold diethyl ether. The solid left after this washing (0.79 g.) was 5,6-dicyano-2-ethoxy-2,3-dihydro-1,4-dithiin, M.P. 106.5–108° C. From the ether wash was obtained by evaporation 0.65 g. of slightly less pure product.

*Example III*

To a stirred solution of 6.8 g. (0.081 mole) of dihydropyran,

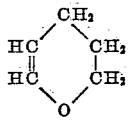

and 17.7 g. (0.054 mole) of potassium ferricyanide in a mixture of 100 ml. of water and 10 ml. of dioxane cooled in an ice bath was added over a 40-minute period a solution of 5.0 g. (0.027 mole) of disodium dimercaptomaleonitrile in 100 ml. of water. A red-orange color developed during the reaction and a brown, tarry material separated. After the addition was completed, the reaction mixture was extracted with diethyl ether, then with chloroform, to separate the organic reaction product. The extract was subjected to liquid phase chromatography on a column of Florida fuller's earth. There was thus obtained 1.69 g. of pale yellow crystals melting at 103.5–104.5° C. This product was shown by elemental and infrared analysis to be 5,6-dicyano-2,3-(trimethyleneoxy)-2,3-dihydro-1,4-dithiin,

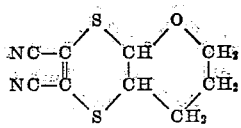

*Analysis.*—Calc'd. for $C_9H_8N_2OS_2$: C, 48.25; H, 3.57; N, 12.50. Found: C, 48.36; H, 3.82; N, 12.45.

*Example IV*

A solution of 5.0 g. (0.027 mole) of disodium dimercaptomaleonitrile in 50 ml. of water was added over a 20-minute period to a stirred mixture at about 20° C. of 17.7 g. (0.054 mole) of potassium ferricyanide and 5.0 g. (0.037 mole) of p-methoxystyrene in 100 ml. of water and 30 ml. of 1,2-dimethoxyethane. After the addition was completed, the resulting red cloudy solution was extracted successively with diethyl ether, methylene chloride and benzene. From the combined extracts was isolated by chromatography on a column of Florida fuller's earth a solid product which was recrystallized from a methylene chloride-cyclohexane mixture. There was thus obtained 0.79 g. of creamy leaflets, M.P. 131–132.5° C. Elemental and infrared analysis showed that this product was 5,6-dicyano-2-(p-methoxyphenyl)-2,3-dihydro-1,4-dithiin,

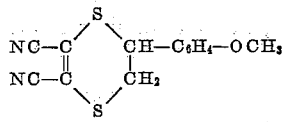

*Analysis.*—Calc'd for $C_{13}H_{10}N_2OS_2$: C, 56.90; H, 3.65; N, 10.21. Found: C, 57.49; H, 3.86; N, 10.26.

*Example V*

A mixture of 5.0 g. (0.027 mole) of disodium dimercaptomaleonitrile and 6.0 g. (0.054 mole) of N-vinyl-2-pyrrolidone,

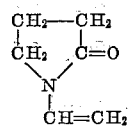

in 30 ml. of 1,2-dimethoxyethane was stirred in an ice bath while a solution of 3.2 g. (0.027 mole) of thionyl chloride in 8 ml. of 1,2-methoxyethane was added over a 5-minute period. The reaction mixture was then filtered to separate the inorganic products and the filtrate was evaporated under reduced pressure. The residual viscous syrup was taken up in methylene chloride and this solution was chilled in solid carbon dioxide for several days until crystallization occurred. There was obtained 1.95 g. of a solid reaction product which, after recrystallization from a methylene chloride-methylcyclohexane mixture melted at 136–137.5° C. This was 5,6-dicyano-2-(2-ketopyrrolidinyl)-2,3-dihydro-1,4-dithiin,

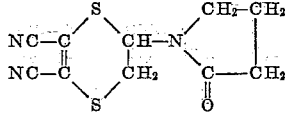

*Analysis.*—Calc'd for $C_{10}H_9N_3OS_2$: C, 47.80; H, 3.59; N, 16.74. Found: C, 47.93; H, 3.67; N, 17.43.

*Example VI*

A solution of 6.4 g. (0.054 mole) of thionyl chloride in 15 ml. of 1,2-dimethoxyethane was added over a 20-minute period to a stirred mixture of 10.0 g. (0.172 mole) of methyl vinyl ether and 10.0 g. (0.054 mole) of disodium dimercaptomaleonitrile cooled in an ice bath. The reaction mixture was then filtered and the filtrate was evaporated to dryness under reduced pressure. The dark solid residue was dissolved in methylene chloride, the solution was treated with decolorizing carbon and filtered, and the filtrate was chilled in solid carbon dioxide. The crystalline product (3.2 g.) which separated melted at 80–90° C. Further recrystallization from methylene chloride gave white crystals, M.P. 82–83° C., of 5,6-dicyano-2-methoxy-2,3-dihydro-1,4-dithiin,

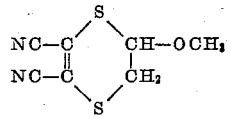

*Analysis.*—Calc'd for $C_7H_6N_2OS_2$: C, 42.40; H, 3.03; N, 14.14. Found: C, 42.74; H, 3.21; N, 14.09.

By following the general procedure described in the foregoing examples, other 2-substituted-2,3-dihydro-5,6-dicyano-1,4-dithiins can be obtained, corresponding to the general formula

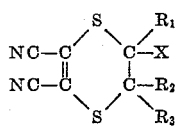

where the symbols $R_1$, $R_2$, $R_3$ and X are as already defined. Representative additional examples of such compounds, obtainable from the already named unsaturates, are listed below, with the formulas of the substituents, it being understood that any radical R not otherwise defined is hydrogen.

5,6-dicyano-2-methoxy-3-methyl-2,3-dihydro-1,4-dithiin (X=—OCH$_3$, R$_2$=—CH$_3$).

5,6 - dicyano - 2 - ethoxy - 2,3 - dimethyl - 2,3 - dihydro - 1,4 - dithiin (X=—OC$_2$H$_5$, R$_1$ and R$_2$=—CH$_3$).

5,6 - dicyano - 2 - (n - dodecoxy) - 2,3 - dihydro - 1,4-dithiin (X=—OC$_{12}$H$_{25}$).

5,6 - dicyano - 2 - (n - octadecoxy) - 2,3 - dihydro - 1,4-dithiin (X=—OC$_{18}$H$_{37}$).

5,6 - dicyano - 2 - (1 - naphthoxy) - 2,3 - dihydro - 1,4-dithiin (X=—OC$_{10}$H$_7$).

5,6 - dicyano - 2 - benzyloxy - 2,3 - dihydro - 1,4 - dithiin (X=—OCH$_2$—C$_6$H$_5$).

5,6 - dicyano - 2 - cyclohexyloxy - 2,3 - dihydro - 1,4-dithiin (X=—OC$_5$H$_{11}$).

5,6 - dicyano - 2 - ($\beta$ - methoxyethoxy) - 2,3 - dihydro-1,4 - dithiin (X=—OCH$_2$CH$_2$OCH$_3$).

5,6 - dicyano - 2 - (p - ethoxyphenoxy) - 2,3 - dihydro-1,4 - dithiin (X=—OC$_6$H$_4$OC$_2$H$_5$).

5,6 - dicyano - 2 - ethylthio - 2,3 - dihydro - 1,4 - dithiin (X=—SC$_2$H$_5$).

5,6-dicyano - 2 - (n - octadecylthio) - 2,3 - dihydro-1,4 - dithiin (X=—SC$_{18}$H$_{37}$).

5,6 - dicyano - 2 - phenylthio - 2,3 - dihydro - 1,4-dithiin (X=—SC$_6$H$_5$).

5,6 - dicyano - 2 - (o - butoxyphenyl) - 2,3 - dihydro-1,4 - dithiin (X=—C$_6$H$_4$OC$_4$H$_9$).

5,6 - dicyano - 2 - (p - phenoxyphenyl) - 2,3 - dihydro-1,4 - dithiin (X=—C$_6$H$_4$OC$_6$H$_5$).

5,6 - dicyano - 2 - (p - methoxyphenyl) - 3 - methyl-2,3 - dihydro - 1,4 - dithiin (X=—C$_6$H$_4$OCH$_3$,

R$_2$=—CH$_3$)

5,6 - dicyano - 2 - (1 - ethoxy - 2 - naphthyl) - 2,3 - dihydro - 1,4 - dithiin (X=—C$_{10}$H$_6$OC$_2$H$_5$).

5,6 - dicyano - 2 - [p - (dimethylamino)phenyl] - 2,3-dihydro - 1,4 - dithiin [X=—C$_6$H$_4$N(CH$_3$)$_2$].

5,6 - dicyano - 2 - [o - (diethylamino)phenyl] - 2,3-dihydro-1,4-dithiin [X=—C$_6$H$_4$N(C$_2$H$_5$)$_2$].

5,6 - dicyano - 2 - [(N-methyl)ethanesulfonamido]-2,3-dihydro-1,4-dithiin

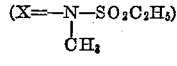

5,6 - dicyano - 2 - [(N-ethyl)cyclohexanesulfonamido]-2,3-dihydro-1,4-dithiin

5,6 - dicyano - 2 - [(N-propyl)-p-toluenesulfonamido]-2,3-dihydro-1,4-dithiin

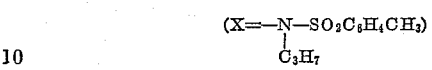

5,6 - dicyano - 2 - [(N - methyl)propionamido] - 2,3-dihydro-1,4-dithiin

5,6 - dicyano - 2 - [(N - methyl)palmitamido] - 2,3-dihydro-1,4-dithiin

5,6 - dicyano - 2 - [(N - butyl)benzamido] - 2,3 - dihydro-1,4-dithiin

5,6 - dicyano - 2 - (2 - ketopiperidyl) - 2,3 - dihydro-1,4-dithiin

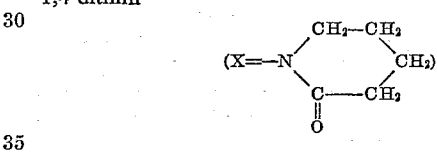

5,6 - dicyano - 2 - (2 - ketohexamethylenimino) - 2,3-dihydro-1,4-dithiin

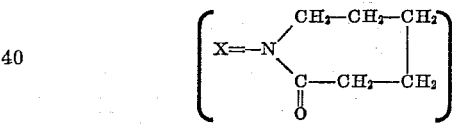

5,6 - dicyano - 2,3 - (2 - methyltrimethyleneoxy) - 2,3-dihydro-1,4-dithiin (X and R$_2$ together=

—O—CH(CH$_3$)—CH$_2$—CH$_2$—)

5,6 - dicyano - 2,3 - (2 - ethylethyleneoxy) - 2,3 - dihydro-1,4-dithiin (X and R$_2$ together=

—O—CH(C$_2$H$_5$)—CH$_2$—)

The preferred compounds of the general formula shown above are those in which the substituents in the 2- and 3-positions have together a total of 1–18 carbon atoms. The most readily accessible and most useful of these compounds are those in which the carbon atom in the 3-position is unsubstituted, i.e., in which R$_2$ and R$_3$ in the above general formula are hydrogen.

The products of this invention have general utility as plasticizers for polymeric materials of the polyester and polyamide types. For example, films cast from cellulose acetate containing about 20%, based on the weight of the total composition, of the compounds illustrated in the foregoing examples show substantially increased pliability and softness over films cast from unmodified cellulose acetate, and the plasticizer shows no tendency to crystallize out of the composition. Similar plasticizing effects are obtained on films of polyvinyl acetate, polyamides and polyethylene terephthalate.

Since obvious modifications and equivalents in the invention will be evident to those skilled in the chemical arts, we propose to be bound solely by the appended claims.

The embodiments of the invention in which an exclu-

The exclusive property or privilege is claimed are defined as follows:

We claim:
1. A compound of the formula

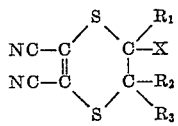

wherein $R_1$, $R_2$ and $R_3$ are selected from the class consisting of hydrogen and hydrocarbon and X is selected from the class consisting of $$-OR, -OROR', -SR, -ArOR, -ArN\begin{matrix}R'\\R'\end{matrix}$$

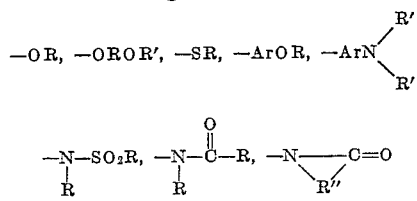

and oxygen joined to $R_2$ to form an oxyalkylene radical, Ar standing for an aromatic hydrocarbon group, R' for an alkyl group, R for any hydrocarbon group free from nonaromatic unsaturation and R'' for an alkylene group.

2. 5,6-dicyano-2-methoxy-2,3-dihydro-1,4-dithiin.
3. 5,6-dicyano-2-ethoxy-2,3-dihydro-1,4-dithiin.
4. 5,6 - dicyano - 2,3 - (trimethyleneoxy) - 2,3 - dihydro-1,4-dithiin.
5. 5,6 - dicyano - 2 - (p - methoxyphenyl) - 2,3 - dihydro-1,4-dithiin.
6. 5,6 - dicyano - 2 - (2 - ketopyrrolidinyl) - 2,3 - dihydro-1,4-dithiin.
7. The process of preparing a compound of claim 1 which comprises bringing in contact (1) disodium dimercaptomaleonitrile, (2) an unsaturate of the formula

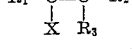

wherein $R_1$, $R_2$, $R_3$ and X are as defined in claim 1, and (3) an oxidizing agent selected from the class consisting of alkali metal ferricyanides, halogen, the sulfur chlorides, the sulfur oxychlorides, mixtures of sulfur and chlorine, perchloryl fluoride and the ammonium and alkali metal persulfates.

8. The process of preparing a 5,6-dicyano-2-alkoxy-2,3-dihydro-1,4-dithiin which comprises bringing in contact (1) disodium dimercaptomaleonitrile, (2) an alkyl vinyl ether, and (3) an oxidizing agent selected from the class consisting of alkali metal ferricyanides, halogen, the sulfur chlorides, the sulfur oxychlorides, mixtures of sulfur and chlorine, perchloryl fluoride and the ammonium and alkali metal persulfates.

9. The process of preparing 5,6-dicyano-2-ethoxy-2,3-dihydro-1,4-dithiin which comprises bringing in contact (1) disodium dimercaptomaleonitrile, (2) ethyl vinyl ether, and (3) thionyl chloride.

10. The process of preparing 5,6-dicyano-2-ethoxy-2,3-dihydro-1,4-dithiin which comprises bringing in contact (1) disodium dimercaptomaleonitrile, (2) ethyl vinyl ether, and (3) an alkali metal ferricyanide.

11. The process of preparing 5,6-dicyano-2-methoxy-2,3-dihydro-1,4-dithiin which comprises bringing in contact (1) disodium dimercaptomaleonitrile, (2) methyl vinyl ether, and (3) thionyl chloride.

12. The process of preparing 5,6-dicyano-2,3-(trimethyleneoxy)-2,3-dihydro-1,4-dithiin which comprises bringing in contact (1) disodium dimercaptomaleonitrile, (2) dihydropyran, and (3) an alkali metal ferricyanide.

13. The process of preparing 5,6-dicyano-2-(p-methoxyphenyl)-2,3-dihydro-1,4-dithiin which comprises bringing in contact (1) disodium dimercaptomaleonitrile, (2) p-methoxystyrene, and (3) an alkali metal ferricyanide.

14. The process of preparing 5,6-dicyano-2-(2-ketopyrrolidinyl) - 2,3 - dihydro - 1,4 - dithiin which comprises bringing in contact (1) disodium dimercaptomaleonitrile, (2) N-vinyl-2-pyrrolidone, and (3) thionyl chloride.

References Cited in the file of this patent
UNITED STATES PATENTS
2,991,292    Degener et al. _____ July 4, 1961